United States Patent
Ito

(10) Patent No.: US 11,394,840 B2
(45) Date of Patent: Jul. 19, 2022

(54) INSPECTION SYSTEM, INFORMATION PROCESSING APPARATUS, AND CONTROL METHOD FOR CONTROLLING THE SAME

(71) Applicant: CANON KABUSHIKI KAISHA, Tokyo (JP)

(72) Inventor: Aya Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/223,650

(22) Filed: Apr. 6, 2021

(65) Prior Publication Data

US 2021/0321011 A1    Oct. 14, 2021

(30) Foreign Application Priority Data

Apr. 8, 2020    (JP) .............................. JP2020-069492

(51) Int. Cl.
*H04N 1/60*    (2006.01)
*H04N 1/00*    (2006.01)
*G06T 7/00*    (2017.01)

(52) U.S. Cl.
CPC ......... *H04N 1/00633* (2013.01); *G06T 7/001* (2013.01); *H04N 1/0057* (2013.01); *H04N 1/00082* (2013.01); *H04N 1/00641* (2013.01); *G06T 2207/30144* (2013.01)

(58) Field of Classification Search
None
See application file for complete search history.

(56) References Cited

U.S. PATENT DOCUMENTS

| | | | |
|---|---|---|---|
| 2015/0131116 A1* | 5/2015 | Sochi | H04N 1/00045 358/1.14 |
| 2017/0210581 A1 | 7/2017 | Van Acquoij et al. | |
| 2017/0264754 A1 | 9/2017 | Mano | |
| 2019/0312982 A1* | 10/2019 | Isokawa | H04N 1/00652 |
| 2020/0051231 A1* | 2/2020 | Tsukamoto | G06T 7/0002 |
| 2020/0210115 A1* | 7/2020 | Igawa | H04N 1/00034 |
| 2020/0322492 A1* | 10/2020 | Kurohata | H04N 1/00076 |
| 2021/0067649 A1* | 3/2021 | Okajima | H04N 1/00639 |
| 2021/0118115 A1* | 4/2021 | Tsukamoto | G06T 7/001 |
| 2021/0321011 A1 | 10/2021 | Ito | |
| 2021/0382669 A1 | 12/2021 | Kimura | |

FOREIGN PATENT DOCUMENTS

| | | | |
|---|---|---|---|
| JP | 2015104853 A | 6/2015 | |
| JP | 6044357 B2 | 12/2016 | |

* cited by examiner

*Primary Examiner* — Dung D Tran
(74) *Attorney, Agent, or Firm* — Canon U.S.A., Inc. IP Division

(57) ABSTRACT

An inspection system inspects a grade of a print product based on comparison between a scanned image obtained by scanning a print product and a reference image, receives a first mode that does not switch a sheet discharge destination of the print product regardless of an inspection result of the print product or a second mode that switches the sheet discharge destination of the print product according to the inspection result of the print product is received through a screen, and controls the sheet discharge destination of the print product based on the received mode and the inspection result.

10 Claims, 14 Drawing Sheets

FIG.4A

Configuration

0401 — Image Save Location:

\\filepath\group\category\title\name\date    [Change]

Operation Mode Setting:
0402 — ○ Log Mode
● Purge Mode

Display Unit Setting:
○ mm
● inch

Sheet Size Initial Value:
[A4 ▼]

[OK] [Cancel]

FIG.4B

Configuration Service Mode

Recovery Setting:
0403 — ○ Not Recover
● Recover

[OK] [Cancel]

FIG.4C

Configuration

Operation Mode Setting:
○ Log Mode
○ Purge Mode/Recover
● Purge Mode/Not Recover

[OK] [Cancel]

FIG. 12

| No. | PROPERTIES OF PRINT JOB | LOG MODE | PURGE MODE (RECOVER) | PURGE MODE (NOT RECOVER) |
|---|---|---|---|---|
| 1 | SHEET SIZE: LONG | PASS | FAIL | FAIL |
| 2 | ABUSE PROHIBITION, SECRET MODE | PASS | FAIL | PASS |
| 3 | NUMBER OF COPIES ≤ 5 | PASS | FAIL | FAIL |
| 4 | USE OF PLURALITY OF SHEETS | PASS | PASS | FAIL |
| 5 | USE OF ONLINE FINISHER | FAIL | PASS | FAIL |
| 6 | USE OF OFFLINE FINISHER FOR DETERMINING PASS OR FAIL ON BOOKLET-BY-BOOKLET BASIS | PASS | FAIL | FAIL |
| 7 | SHEET TYPE: HIGH-GRADE PAPER | PASS | FAIL | PASS |
| 8 | SADDLE STITCHING | FAIL | PASS | FAIL |
|  |  |  |  |  |
|  |  |  |  |  |

1201

US 11,394,840 B2

INSPECTION SYSTEM, INFORMATION PROCESSING APPARATUS, AND CONTROL METHOD FOR CONTROLLING THE SAME

BACKGROUND

Field of the Disclosure

The present disclosure relates to control of an inspection system that inspects the quality of a print product.

Description of the Related Art

An inspection apparatus is known that reads a print product printed by a printing apparatus and inspects the quality of the print product. The inspection apparatus can detect an image defect such as stain or missing print, a character error, and a barcode quality. If a resulting product in which a defect is detected and a resulting product in which a defect is not detected are discharged to the same sheet discharge destination, one cannot tell which resulting product has a defect.

To address such an issue, a technique for distinguishing all of the sheet discharge destinations for a case where an inspection is not executed on a print job, a case where a defect is detected as a result of the inspection in a print job in which the inspection is executed, and a case where a defect is not detected as result of the inspection in the print job in which the inspection is executed is discussed (Japanese Patent No. 6044357).

In the conventional art, however, in a case where a defect is detected as a result of the inspection, a sheet is always discharged to a sheet discharge destination different from that of a resulting product in which a defect is not detected as a result of the inspection. Thus, it is not possible to select such an option where sheets are discharged to the same sheet discharge destination regardless of the inspection result, and for example, after printing is performed, a user extracts a print product while confirming the inspection result.

SUMMARY

The present disclosure is directed to providing a technique capable of controlling whether to switch a sheet discharge destination according to the inspection result of the quality of a print product.

According to an aspect of the present disclosure, an inspection system that inspects a quality of a print product includes an inspection unit configured to inspect a quality of the print product based on comparison between a scanned image obtained by scanning a print product and a reference image, a display control unit configured to display a screen for receiving a first mode that does not switch a sheet discharge destination of the print product regardless of an inspection result of the print product and a second mode that switches the sheet discharge destination of the print product according to the inspection result of the print product, a reception unit configured to receive via the screen the first mode that does not switch the sheet discharge destination of the print product regardless of the inspection result of the print product or the second mode that switches the sheet discharge destination of the print product according to the inspection result of the print product, and a control unit configured to, based on a mode received by the reception unit, control the sheet discharge destination of the print product.

Further features of the present disclosure will become apparent from the following description of exemplary embodiments with reference to the attached drawings.

BRIEF DESCRIPTION OF THE DRAWINGS

FIGS. 4A, 4B, and 4C are setting screens of the inspection apparatus for specifying an operation mode of the inspection apparatus and the inspection unit.

FIG. 12 illustrates correspondence table of information regarding a print job, an operation mode, and recovery setting according to one or more aspects of the present disclosure.

DESCRIPTION OF THE EMBODIMENTS

Exemplary embodiments for carrying out the present disclosure will be described below with reference to the drawings. Unless otherwise noted, the present disclosure can be applied to both an inspection apparatus composed of a single device and an inspection apparatus composed of a plurality of devices so long as a function according to the present disclosure is achieved. The present disclosure can also be applied to an inspection apparatus that makes a connection via a network such as a local area network (LAN) or a wide area network (WAN) and performs processing, so long as the function according to the present disclosure is achieved. That is, the configuration of a system which is described in the following exemplary embodiments and where various terminals are connected together is merely an example, and there are various examples of the configuration of the system according to the use or purpose.

Figure 1:
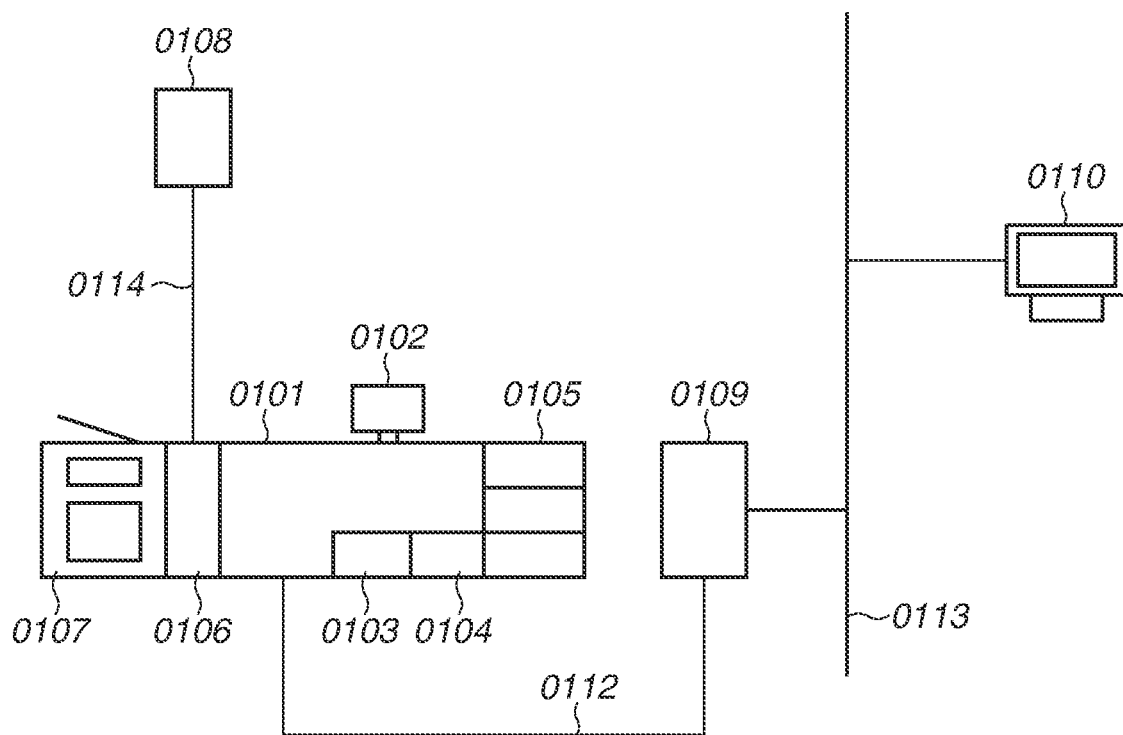
FIG. 1 is a schematic diagram illustrating configurations of an information processing apparatus, an inspection apparatus, and a printing apparatus.

FIG. 1 illustrates an inspection system according to the present exemplary embodiment and is a schematic diagram illustrating the configurations of an information processing apparatus, an inspection apparatus, and a printing apparatus. The printing apparatus according to the present exemplary embodiment is described using an electrophotographic printing apparatus, but may be a printing apparatus using a different image forming method such as an inkjet method or an offset method.

A printing apparatus 0101 is connected to an information processing apparatus 0109 via a network 0112. The information processing apparatus 0109 is connected to a client computer 0110 via a network 0113.

The printing apparatus 0101 includes a user interface (UI) panel 0102, a sheet feeding deck 0103, and a sheet feeding deck 0104. Further, an optional deck 0105 composed of three sheet feeding decks is connected to the printing apparatus 0101. The printing apparatus 0101 is, for example, an electrophotographic printing apparatus. The UI panel 0102 is, for example, a user interface including a touch panel of a capacitive type.

Further, the printing apparatus 0101 includes an inspection unit 0106 and a large-capacity stacker 0107. Particularly, the inspection unit 0106 may be included within the printing apparatus 0101. The inspection unit 0106 is connected to an inspection apparatus 0108 via a cable 0114. The large-capacity stacker 0107 includes a main tray and a top tray. The main tray can stack several thousands of sheets at a time.

A print job is generated by the client computer 0110, transmitted to the information processing apparatus 0109 via the network 0113, and managed by the information processing apparatus 0109. Then, the print job is transmitted from the information processing apparatus 0109 to the printing apparatus 0101 via the cable 0112. Then, the printing apparatus 0101 performs the process of printing on a sheet. Alternatively, a form may be employed in which a print job is generated and managed by the information processing apparatus 0109, transmitted to the printing apparatus 0101 via the network 0112, and managed by the printing apparatus 0101.

In addition to the inspection unit 0106 and the large-capacity stacker 0107, a finisher capable of stapling, a folding machine, or a bookbinding machine may be connected to the printing apparatus 0101.

Figure 2:
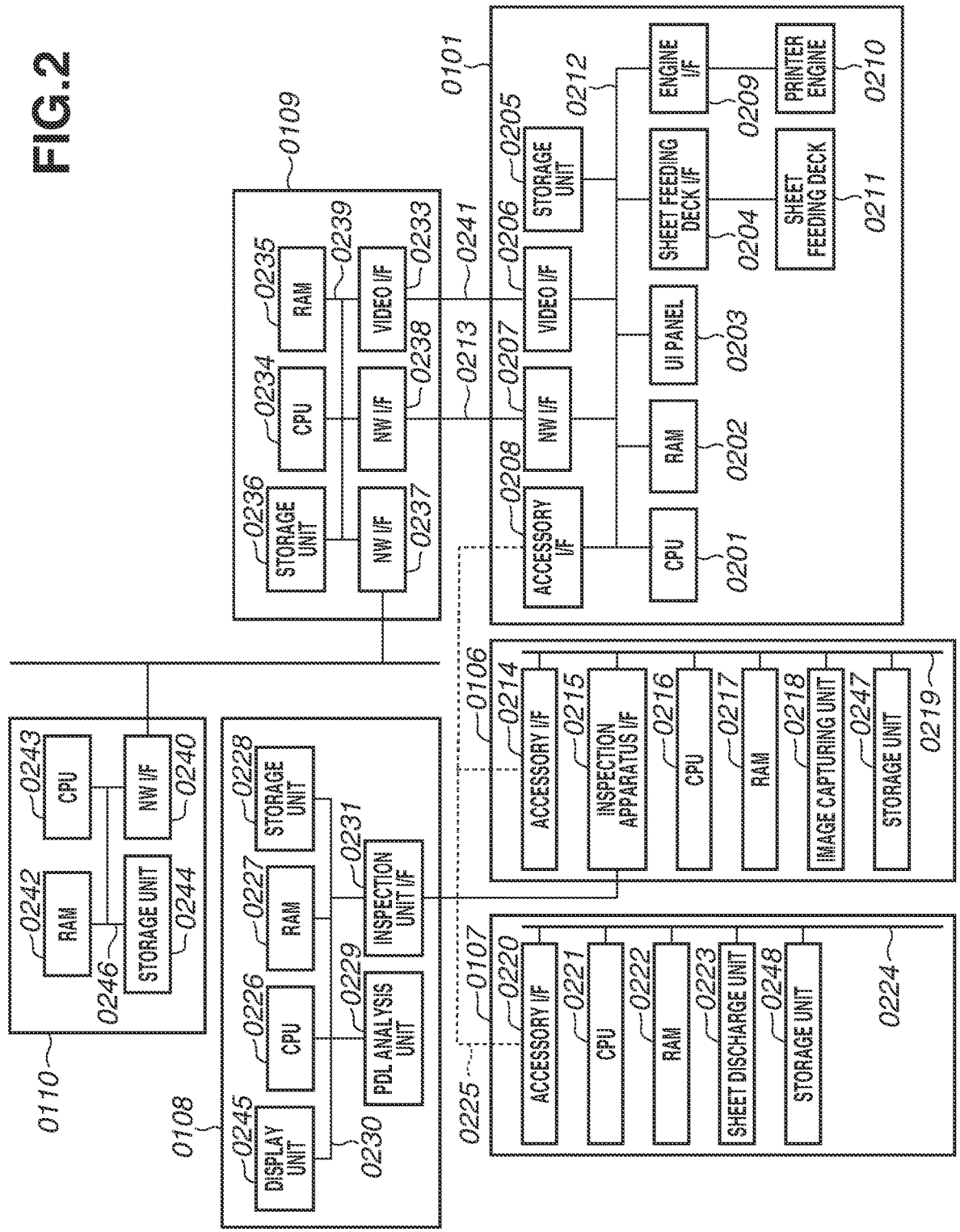
FIG. 2 is a block diagram illustrating the configurations of the information processing apparatus, the inspection apparatus, and the printing apparatus.

FIG. 2 is a block diagram illustrating the control configurations of the printing apparatus 0101, the inspection apparatus 0108, the large-capacity stacker 0107, the information processing apparatus 0109, and the client computer 0110 according to the present exemplary embodiment.

A central processing unit (CPU) 0201 governs control and calculation in components in the printing apparatus 0101 via a system bus 0212. The CPU 0201 governs the execution of a program stored in a storage unit 0205 and loaded into a random-access memory (RAM) 0202. The RAM 0202 is a type of general volatile storage device directly accessible by the CPU 0201 and is used as a work area for the CPU 0201 or another temporary data storage area. The storage unit 0205 functions as a temporary storage area and a work memory when the printing apparatus 0101 operates.

An engine interface (I/F) 0209 governs communication with and control of a printer engine 0210. A sheet feeding deck I/F 0204 governs communication with and control of a sheet feeding deck 0211. The sheet feeding deck 0211 is a collective term for the sheet feeding decks 0103 and 0104 and the optional deck 0105 as a hardware component. A UI panel 0203 is a hardware component of the UI panel 0102 and is a user interface for performing the overall operation of the printing apparatus 0101. In the present exemplary embodiment, the UI panel 0203 includes a touch panel of a capacitive type.

A network interface (hereinafter, "NW I/F") 0207 is connected to an NW I/F 0238 of the information processing apparatus 0109 via a cable 0213 and governs communication between the information processing apparatus 0109 and the printing apparatus 0101. In this example, a form is employed in which interfaces connected to the system bus 0212 and a system bus 0239 are directly connected together. Alternatively, a form may be employed in which the information processing apparatus 0109 and the printing apparatus 0101 are connected together, for example, via a network. In other words, the connection form between the information processing apparatus 0109 and the printing apparatus 0101 is not limited. A video I/F 0206 is connected to a video I/F 0233 via a video cable 0241 and governs the communication of image data between the information processing apparatus 0109 and the printing apparatus 0101.

Alternatively, in the information processing apparatus 0109, connection interfaces with the printing apparatus 0101 may employ a form in which the functions of the NW I/F 0238 and the video I/F 0233 are integrated together. In the printing apparatus 0101, connection interfaces with the information processing apparatus 0109 may employ a form in which the functions of the NW I/F 0207 and the video I/F 0206 are integrated together.

An accessory I/F 0208 connects to an accessory I/F 0214 and an accessory I/F 0220 via a cable 0225. That is, the printing apparatus 0101 communicates with the inspection unit 0106 and the large-capacity stacker 0107 via the accessory I/Fs 0208, 0214, and 0220.

A CPU 0216 governs, via a system bus 0219, control and calculation in components in the inspection unit 0106 and the execution of a program stored in a storage unit 0247 and loaded into a RAM 0217. The RAM 0217 is a type of general volatile storage device directly accessible by the CPU 0216 and is used as a work area for the CPU 0216 or another temporary data storage area. The storage unit 0247 functions as a temporary storage area and a work memory when the inspection apparatus 0108 operates. An inspection apparatus I/F 0215 connects to an inspection unit I/F 0231 via a cable. That is, the inspection unit 0106 communicates with the inspection apparatus 0108 via the inspection apparatus I/F 0215 and the inspection unit I/F 0231.

An image capturing unit 0218 has an image capturing function and includes, for example, a contact image sensor (hereinafter, "CIS"). The image capturing unit 0218 captures an image of a sheet passing inside the inspection unit 0106 and transmits the captured image to the inspection apparatus 0108 via the inspection apparatus I/F 0215. The CIS included in the image capturing unit 0218 is merely an example of a sensor, and may be a sensor of another type such as a charge-coupled device (CCD) image sensor. That is, the image capturing method of the image capturing unit 0218 is not limited.

A CPU 0221 governs, via a system bus 0224, control and calculation in components in the large-capacity stacker 0107 and the execution of a program stored in a storage unit 0248 and loaded into a RAM 0222. The RAM 0222 is a type of general volatile storage device directly accessible by the CPU 0221 and is used as a work area for the CPU 0221 or another temporary data storage area. The storage unit 0248 functions as a temporary storage area and a work memory when the inspection apparatus 0108 operates. A sheet discharge unit 0223 governs an operation for discharging a sheet to the main tray and the top tray (a sub-tray), and monitoring and control of the stacking state of each of the main tray and the top tray.

A CPU 0226 governs, via a system bus 0230, control and calculation in components in the inspection apparatus 0108 and the execution of a program stored in a storage unit 0228 and loaded into a RAM 0227. The RAM 0227 is a type of general volatile storage device directly accessible by the CPU 0226 and is used as a work area for the CPU 0226 or another temporary data storage area. The storage unit 0228 functions as a temporary storage area and a work memory when the inspection apparatus 0108 operates. A page description language (PDL) analysis unit 0229 reads PDL data, such as PDF, PostScript, or Printer Command Language (PCL) data, received from the client computer 0110 or the information processing apparatus 0109 and executes the process of interpreting the PDL data. A display unit 0245 is, for example, a liquid crystal display connected to the inspection apparatus 0108. The display unit 0245 receives an input from a user to the inspection apparatus 0108 and displays the state of the inspection apparatus 0108. A CPU 0234 governs, via the system bus 0239, control and calculation in components in the information processing apparatus 0109 and the execution of a program stored in a storage unit 0236 and loaded into a RAM 0235. The RAM 0235 is a type of general volatile storage device directly accessible by the CPU 0234 and is used as a work area for the CPU 0234 or another temporary data storage area. The storage unit 0236 functions as a temporary storage area and a work memory when the information processing apparatus 0109 operates. An NW I/F 0237 is connected to an NW I/F 0240 via a network. The information processing apparatus 0109 communicates with the client computer 0110 via the NW I/Fs 0237 and 0240.

In the present exemplary embodiment, a form is described in which the information processing apparatus 0109 and the inspection apparatus 0108 do not communicate with each other. The form according to the present exemplary embodiment, however, is merely an example. Alternatively, a form may be employed in which the inspection apparatus 0108 includes an NW I/F, and the information processing apparatus 0109 communicates with the inspection apparatus 0108 via this NW I/F and the NW I/F 0237.

A CPU 0243 governs, via a system bus 0246, control and calculation in components in the client computer 0110 and the execution of a program stored in a storage unit 0244 and loaded into a RAM 0242. The RAM 0242 is a type of general volatile storage device directly accessible by the CPU 0243 and is used as a work area for the CPU 0243 or another temporary data storage area. The storage unit 0244 functions as a temporary storage area and a work memory when the client computer 0110 operates.

Figure 3:
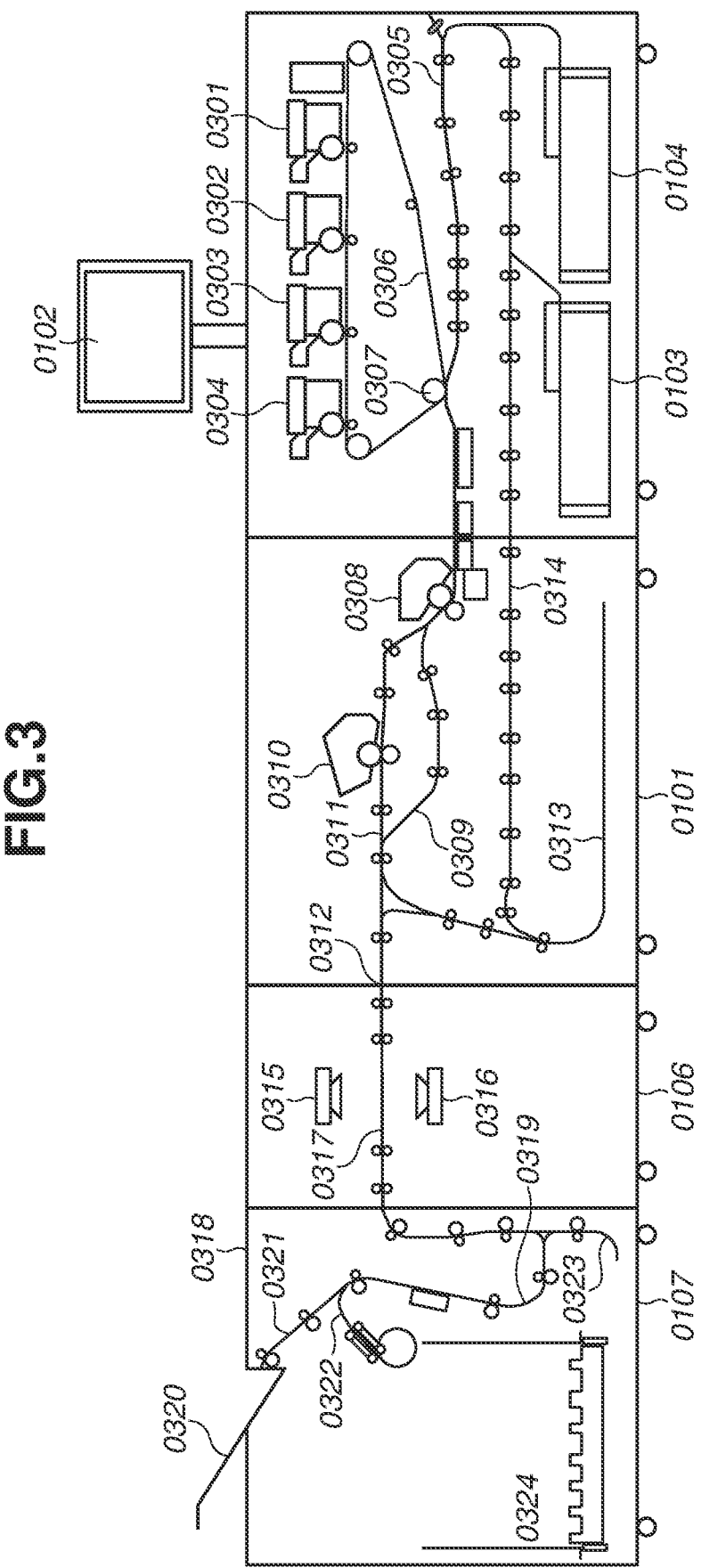
FIG. 3 is a diagram illustrating internal configurations of the information processing apparatus, an inspection unit, the printing apparatus, and a large-capacity stacker.

FIG. 3 is a diagram illustrating the internal configurations of the printing apparatus 0101, the inspection unit 0106, and the large-capacity stacker 0107. The printing apparatus 0101 receives an input from the user and displays the states of printing and devices through the UI panel 0102. The sheet feeding decks 0103 and 0104 can store various sheets. Each of the sheet feeding decks 0103 and 0104 can separate only the top sheet among the stored sheets and convey the separated sheet to a sheet conveying path 0305. Development stations 0301 to 0304 form toner images using colored toner of yellow (Y), magenta (M), cyan (C), and black (K), respectively, to form a color image. The toner images formed at this time are primarily transferred onto an intermediate transfer belt 0306. The intermediate transfer belt 0306 rotates clockwise in FIG. 3 and transfers the toner images onto the sheet conveyed from the sheet conveying path 0305 at a secondary transfer position 0307. A fixing unit 0308 includes a pressure roller and a heating roller. The sheet passes between the rollers, whereby the fixing unit 0308 melts and pressure-bonds the toner and fixes the toner images to the sheet. The sheet having come out of the fixing unit 0308 passes through a sheet conveying path 0309 and is conveyed to a portion 0312. If the toner needs to be further melted and pressure-bonded to fix the toner depending on the type of the sheet, after the sheet passes through the fixing unit 0308, the sheet is conveyed to a second fixing unit 0310 using an upper sheet conveying path. After the toner is additionally melted and pressure-bonded by the second fixing unit 0310, the sheet passes through a sheet conveying path 0311 and is conveyed to the portion 0312. If the image formation mode is set to two-sided printing, the sheet is conveyed to a sheet reverse path 0313, reversed in the sheet reverse path 0313, and then conveyed to a two-sided conveying path 0314. Then, an image is transferred onto the second surface of the sheet at the secondary transfer position 0307.

In the inspection unit 0106, CISs 0315 and 0316 are placed opposed to each other. The CIS 0315 is a sensor that reads an upper surface of the sheet, and the CIS 0316 is a sensor that reads a lower surface of the sheet. At the timing when the sheet conveyed to a sheet conveying path 0317 reaches a predetermined position, the inspection unit 0106 scans the sheet using the CIS 0315 or 0316. A scanned image obtained by scanning the sheet is transmitted to the inspection apparatus 0108 via the inspection apparatus I/F 0215 and the inspection unit I/F 0231. The CPU 0226 determines whether a defect is present in the received image. Then, the CPU 0226 notifies the inspection unit 0106 of the determination result via the inspection unit I/F 0231 and the inspection apparatus I/F 0215 again. The CPU 0216 notifies the large-capacity stacker 0107 of the received determination result via the accessory I/Fs 0214 and 0220.

The large-capacity stacker 0107 can stack a large number of sheets. The large-capacity stacker 0107 includes a main tray 0324 as a tray for stacking the sheet. The sheet having passed through the inspection unit 0106 enters the large-capacity stacker 0107 through a sheet conveying path 0319. The sheet is conveyed from the sheet conveying path 0319, passes through a sheet conveying path 0322, and is stacked in the main tray 0324. Further, the large-capacity stacker 0107 includes a top tray 0320 as a sheet discharge tray. The CPU 0221 discharges to the top tray 0320 a sheet in which a defect is detected by the inspection apparatus 0108. In a case where the sheet is to be output to the top tray 0320, the sheet is conveyed from the sheet conveying path 0319, passes through a sheet conveying path 0321, and is conveyed to the top tray 0320. A reverse unit 0323 reverses the sheet. The reverse unit 0323 is used to stack the sheet in the main tray 0324. To stack the sheet in the main tray 0324 so that the direction of the sheet when the sheet enters the large-capacity stacker 0107 and the direction of the sheet when the sheet is stacked are the same, the sheet is reversed once by the reverse unit 0323. To convey the sheet to the top tray 0320, the sheet is discharged as is without being flipped over when the sheet is stacked. Thus, the operation for reversing the sheet in the reverse unit 0323 is not performed.

FIG. 4A is a setting screen for an operation mode in the inspection apparatus 0108. An operation mode setting screen 0401 is displayed on the display unit 0245 and receives an operation mode setting from the user. If a "log mode" is selected in an operation mode selection portion 0402, the printing apparatus 0101 discharges an inspected sheet to a sheet discharge destination specified in advance in the properties of a print job, regardless of the inspection result by the inspection apparatus 0108. That is, in the "log mode", the sheet discharge destination of a sheet the inspection result of which is "pass" according to the determination and the sheet discharge destination of a sheet the inspection result of which is "fail" according to the determination are not differentiated from each other, and the sheets are discharged to the same sheet discharge destination. The inspection result can be saved as a log and the user can check the log. If a "purge mode" is selected in the operation mode selection portion 0402, the printing apparatus 0101 discharges a sheet the inspection result of which is "fail" to the top tray 0320. That is, in the "purge mode", the sheet discharge destination of a sheet the inspection result of which is "pass" according to the determination and the sheet discharge destination of a sheet the inspection result of which is "fail" according to the determination are differentiated from each other.

The setting screen in FIG. 4A further receives the setting of a save location where a reference image is saved, the setting of the display unit of the reference image, and the setting of the sheet size of the reference image.

FIG. 4B is a setting screen for a recovery setting in the purge mode in the inspection apparatus 0108. If the "purge mode" is selected in the operation mode selection portion 0402, further, a recovery setting on a recovery setting screen 0403 is reflected. The recovery setting screen 0403 is displayed on the display unit 0245 and receives a recovery setting from the user. If "not recover" is selected on the recovery setting screen 0403, the printing apparatus 0101 discharges only a sheet the inspection result of which is "fail" to the top tray 0320. The printing apparatus 0101 and the inspection apparatus 0108 continue to inspect subsequent sheets as usual. If "recover" is selected on the recovery setting screen 0403, the printing apparatus 0101 discharges to the top tray 0320 a sheet the inspection result of which is "fail" and all subsequent sheets already fed and present in the printing apparatus 0101 when the inspection apparatus 0108 determines that the inspection result is "fail". Then, when the sheets are not present on the sheet conveying paths, the printing apparatus 0101 and the inspection apparatus 0108 resume the printing and the inspection from an image printed on the sheet the inspection result of which is "fail". The inspection apparatus 0108 according to the present exemplary embodiment executes an inspection by capturing an image using the CIS 0315 or 0316 of the inspection unit 0106 while the printing apparatus 0101 performs printing. Thus, when the inspection apparatus 0108 determines that the inspection result of a certain sheet is "fail", subsequent sheets may have already reached the sheet conveying path 0309 or 0311. However, unless all the sheets on the sheet conveying paths are discharged, it is not possible to reprint an image printed on the sheet the inspection result of which is "fail", transmit sheets to the sheet discharge destination specified in advance by the print job, and stack the sheets in correct output order. Thus, if "recover" is set, such an operation is executed.

If the "purge mode" and "not recover" are set, a sheet the inspection result of which is "fail" and a sheet the inspection result of which is "pass" are discharged to different sheet discharge destinations. In the present exemplary embodiment, a sheet the inspection result of which is "fail" is discharged to the top tray 0320, and a sheet the inspection result of which is "pass" is discharged to the main tray 0324. If the "purge mode" and "recover" are set, all the pages specified by the print job are discharged to the main tray 0324 in correct page order, all the pages being sheets the inspection result of which is "pass". The setting of "recover" may be an instruction to perform reprinting from an image corresponding to a sheet the inspection result of which is "fail".

Although the terms "log mode" and "purge mode" are used in the present exemplary embodiment, for example, the "log mode" corresponds to a first mode that does not switch a sheet discharge destination regardless of the inspection result of a captured image, and the "purge mode" corresponds to a second mode that switches the sheet discharge destination according to the inspection result of the captured image. Further, if "not recover" is set, the sheet discharge destinations of a sheet for which the inspection result of the captured image is "fail" and a sheet for which the inspection result of the captured image is "pass" are switched, and an image corresponding to the sheet the inspection result of which is "fail" is not reprinted. If "recover" is set, reprinting is performed from an image corresponding to the sheet the inspection result of which is "fail", and a resulting product the inspection result of which is "pass" according to the determination is discharged to a certain sheet discharge destination (e.g., the main tray 0324) in proper page order.

In the first mode that does not switch the sheet discharge destination regardless of the inspection result of the captured image, a log for confirming the inspection result is held. However, a log for confirming the inspection result may be held also in the second mode that switches the sheet discharge destination according to the inspection result of the captured image.

In the "log mode", the user confirms a log and then performs the work of extracting sheets after the job ends. Alternatively, the user performs the process of transmitting log data to a finishing apparatus and extracting a "fail" sheet or a bundle including a "fail" sheet in the finishing apparatus.

The CPU 0226 notifies the inspection unit 0106, via the inspection unit I/F 0231 and the inspection apparatus I/F 0215, of the operation mode and the recovery setting set in the operation mode selection portion 0402 and on the recovery setting screen 0403, respectively. The CPU 0226 saves in the RAM 0227 the operation mode and the recovery setting set in the operation mode selection portion 0402 and on the recovery setting screen 0403. The CPU 0216 saves in the RAM 0217 the operation mode and the recovery setting set in the operation mode selection portion 0402 and on the recovery setting screen 0403.

In the present exemplary embodiment, a screen for specifying the operation mode and the recovery setting has been described using an example where the operation mode and the recovery setting are specified through different screens as illustrated in FIGS. 4A and 4B. Alternatively, as illustrated in FIG. 4C, the operation mode and the recovery setting may be specified on the same screen.

Figure 5:
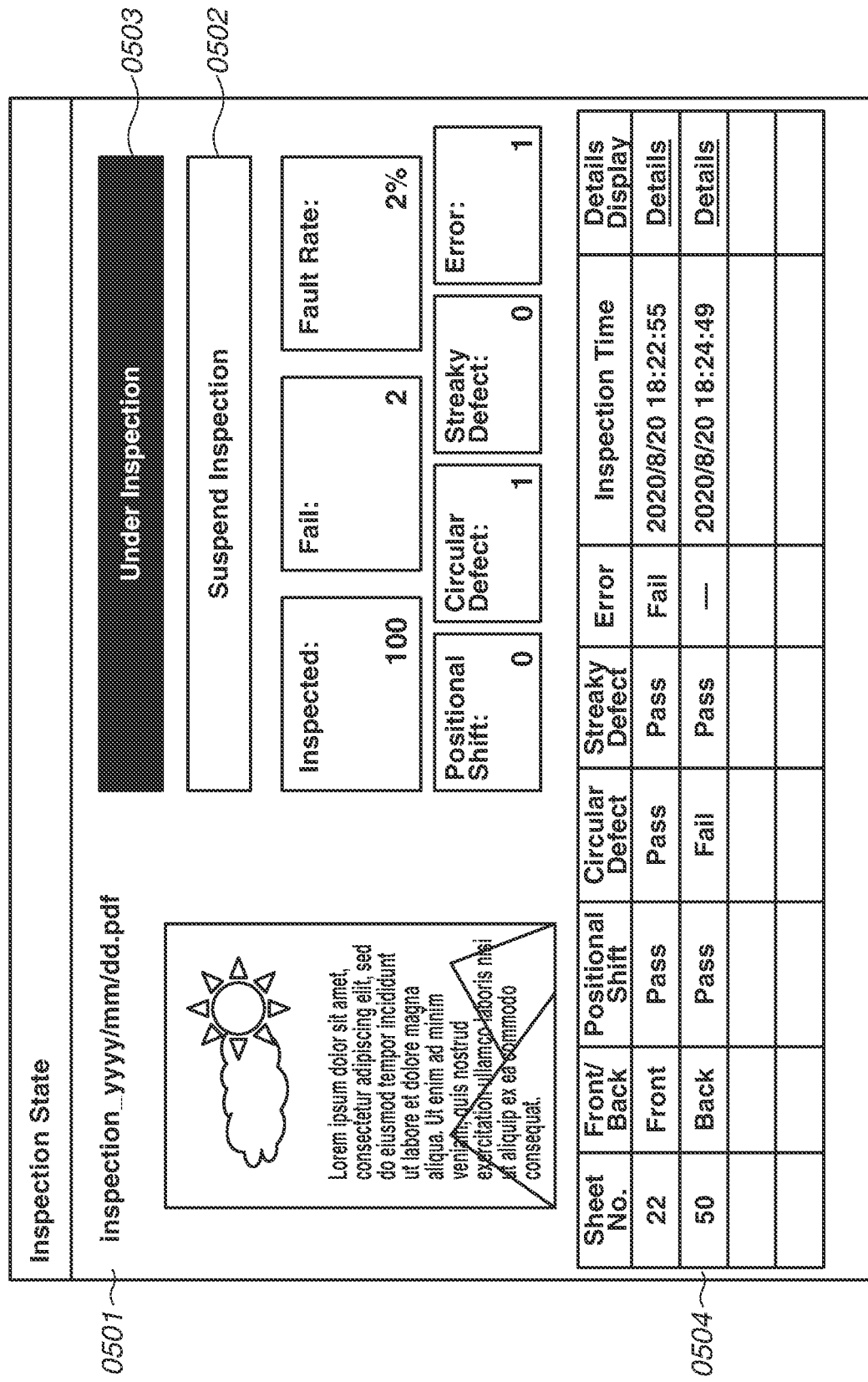
FIG. 5 is an inspection state screen displayed on the inspection apparatus when an inspection is performed.

FIG. 5 is an inspection state screen displayed on the display unit 0245 when an inspection is executed.

An inspection state screen 0501 is displayed on the display unit 0245, receives the execution and the suspension of an inspection, and displays an inspection state. An inspection button 0502 receives the execution of an inspection and the suspension of the inspection from the user. If the inspection button 0502 is pressed, a character string on the button changes to "suspend inspection", and an inspection status 0503 changes to "under inspection". If the inspection button 0502 is pressed again, the character string on the button changes to "start inspection", and the inspection status 0503 changes to "under suspension". After that, every time the inspection button 0502 is pressed, the character string on the inspection button 0502 and the inspection status 0503 change in a toggle manner.

The inspection state screen 0501 displays, in real time during an inspection, the number of inspected sheets, the number of sheets the inspection result of which is "fail", the defect rate, and the numbers of causes of the inspection result "fail". In the inspection state screen 0501, "error" indicates the number of inspection results equivalent to the inspection result "fail" according to the determination in a case where the inspection apparatus 0108 determines that a timeout error has occurred because the inspection has not completed within a predetermined inspection time. Every time the inspection result "fail" occurs, the sheet number of a sheet the inspection result of which is "fail", information regarding whether the front or the back, the causes of the inspection result "fail", the inspection time, and a link to a "fail" details screen (not illustrated) are added to an inspection "fail" list 0504. When "details" is selected, the display unit 0245 displays a screen where a captured image the inspection result of which is "fail" and the position of a defect can be viewed.

Figure 6:
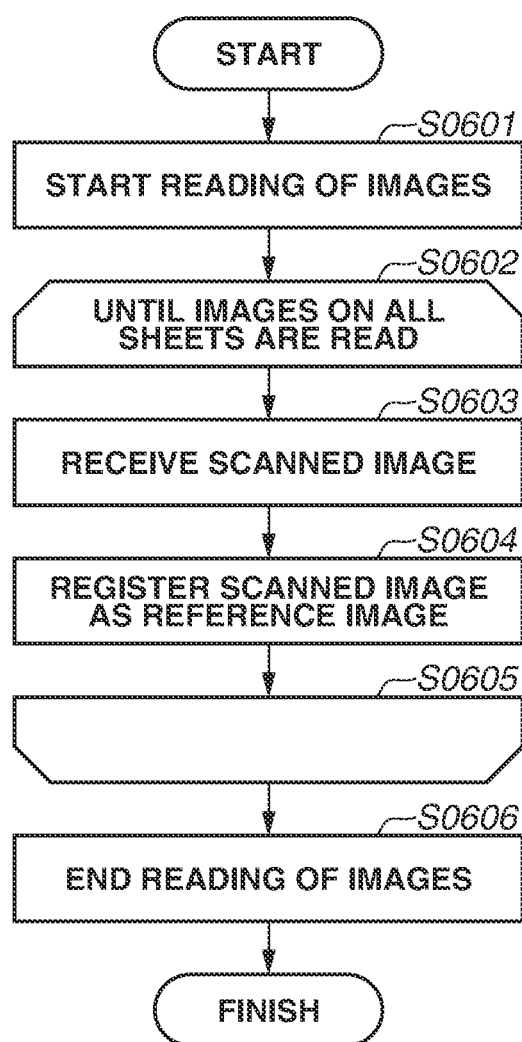
FIG. 6 is an operation flowchart of the inspection apparatus when a reference image is registered.

FIG. 6 is an operation flowchart of the inspection apparatus 0108 when a reference image for an inspection is registered.

In step S0601, the CPU 0226 receives an image reading start instruction from the user through an inspection button 0502 on the display unit 0245. Next, in step S0602, if there is a sheet on which an image is to be read, the processing proceeds to step S0603.

In step S0603, the inspection unit I/F 0231 receives an image scanned by the CIS 0315 or 0316 from the inspection apparatus I/F 0215. Next, in step S0604, the CPU 0226 registers the image received in step S0603 as a reference image in the RAM 0227.

Then, the processing proceeds to step S0605, and steps S0602 to S0605 are repeated until the reading of images on all the sheets is completed. If the reading of images on all the sheets is completed, then in step S0606, the CPU 0226 receives an image reading end instruction from the user on the display unit 0245.

The example illustrated here is merely an example. Alternatively, for example, the image reading start instruction from the user on the display unit 0245 may be automatically given in conjunction with a printing start instruction in the printing apparatus 0101, the information processing apparatus 0109, or the client computer 0110. The image reading end instruction from the user on the display unit 0245 may be automatically given in conjunction with the completion of printing in the printing apparatus 0101.

Yet alternatively, for example, a form may be employed in which the inspection apparatus 0108 reads a plurality of images on the same page and registers the result of combining the images as a reference image.

Processing as the feature of the present exemplary embodiment will be described below with reference to flowcharts.

A program for the printing apparatus 0101 regarding these flows is stored in the storage unit 0205 of the printing apparatus 0101, loaded into the RAM 0202, and executed by the CPU 0201. A program for the inspection apparatus 0108 regarding these flows is stored in the storage unit 0228 of the inspection apparatus 0108, loaded into the RAM 0227, and executed by the CPU 0226. A program for the information processing apparatus 0109 regarding these flows is stored in the storage unit 0236 of the information processing apparatus 0109, loaded into the RAM 0235, and executed by the CPU 0234. A program for the client computer 0110 regarding these flows is stored in the storage unit 0244 of the client computer 0110, loaded into the RAM 0242, and executed by the CPU 0243.

Figure 7:
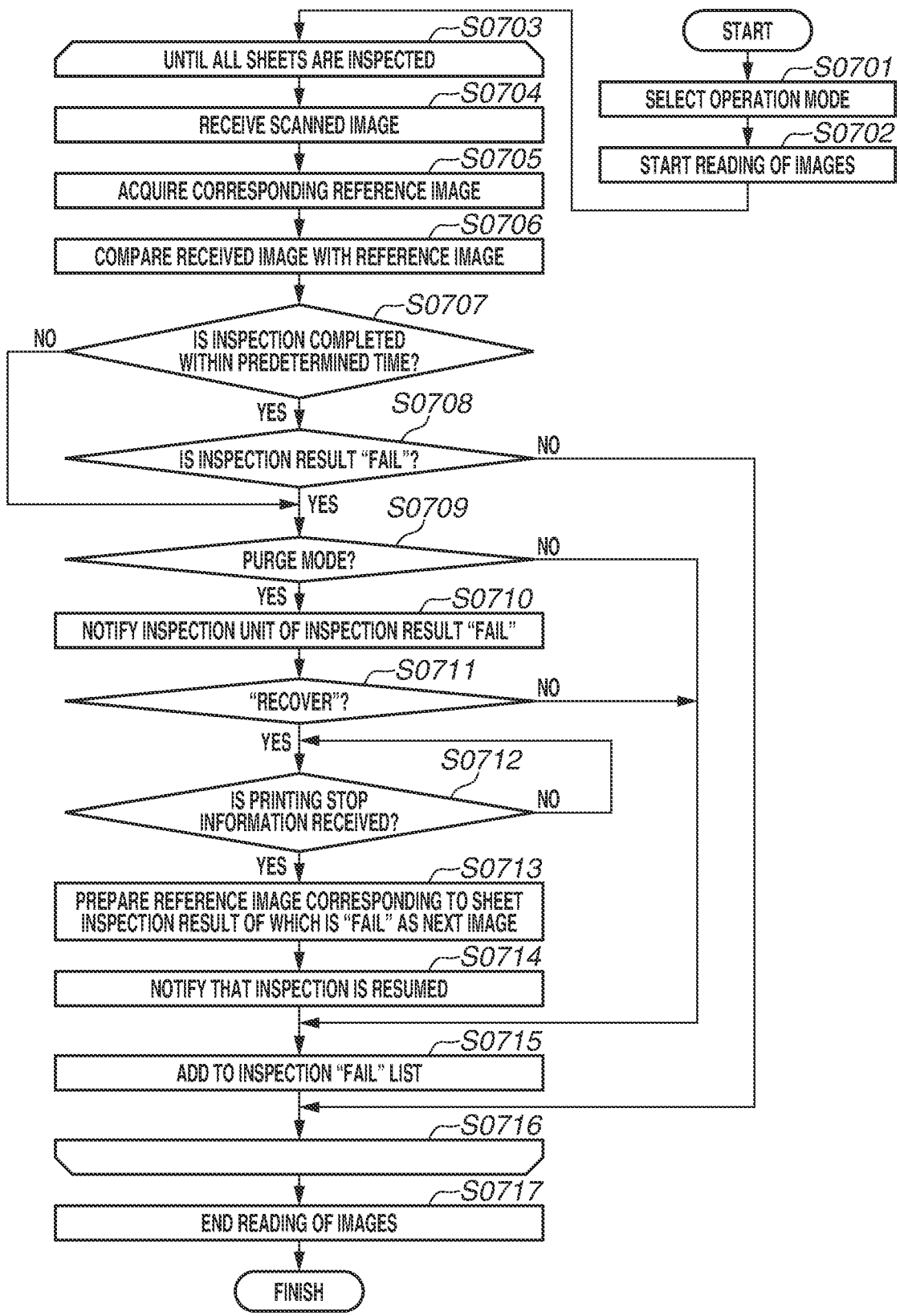
FIG. 7 is an operation flowchart of the inspection apparatus when an inspection is performed according to one or more aspects of the present disclosure.

FIG. 7 is an operation flowchart of the inspection apparatus 0108 when an inspection is performed.

In step S0701, the CPU 0226 receives an operation mode and a recovery setting in the operation mode selection portion 0402 and on the recovery setting screen 0403, respectively. Next, in step S0702, the CPU 0226 receives an image reading start instruction from the user via the display unit 0245. Next, in step S0703, if there is a sheet as an inspection target, the processing proceeds to step S0704.

In step S0704, the inspection unit I/F 0231 receives an image scanned by the CIS 0315 or 0316 from the inspection apparatus I/F 0215. In step S0705, the CPU 0226 reads from the RAM 0227 a reference image for a corresponding page that is registered in step S0604.

Next, in step S0706, the CPU 0226 compares the reference image read in step S0705 and the scanned image of the inspection target received in step S0704. In this comparison operation, first, using characteristic points on the images as alignment reference points, the positions of the reference image and the scanned image of the inspection target are adjusted. Next, in the scanned image of the inspection target, the four corners of the sheet and the alignment reference point on the scanned image are analyzed, thereby detecting whether there is a positional shift in the image relative to the sheet. Next, the density value of the reference image and the density value of the scanned image of the inspection target are compared with each other on a pixel-by-pixel basis. As a result of the above, if a defect is not detected, the inspection result is "pass".

Next, in step S0707, if the inspection is completed within a predetermined time (YES in step S0707), the processing proceeds to step S0708. If the inspection is not completed within the predetermined time (NO in step S0707), the processing proceeds to step S0709. In the present exemplary embodiment, a series of processes for scanning an image of a sheet, inspecting the sheet, changing the sheet discharge destination of the sheet according to the inspection result, and discharging the sheet is sequentially executed for each page. Thus, the series of processes on a certain page needs to be completed so that the series of processes on the next page can be performed. In the present exemplary embodiment, in a case where the inspection result is not obtained by completing the inspection within a certain time, processing for the inspection result "fail" is performed. As a result, it is possible to prevent the situation where the series of processes on a certain sheet is not completed in time for the CIS 0315 or 0316 to scan the subsequent sheet, and the inspection unit I/F 0231 and the inspection apparatus I/F 0215 to start transmitting and receiving a scanned image obtained by scanning the sheet. Further, if the purge mode is selected in the operation mode selection portion 0402, this also enables the CPU 0221 to switch the conveyance destination of the sheet the inspection result of which is "fail" according to the determination of the inspection apparatus 0108, so that the sheet is discharged to the top tray 0320. The CPU 0226 needs to notify the CPU 0221 that the inspection result is "fail", via the inspection unit I/F 0231, the inspection apparatus I/F 0215, the accessory I/F 0214, and the accessory I/F 0220 before the sheet reaches a point where the conveyance destination of the sheet cannot be switched.

Thus, if the inspection is not completed within the predetermined time, it cannot be determined that the inspection result is "pass", and therefore, the CPU 0226 determines that the inspection result is an error. Thus, the CPU 0226 determines that the inspection result of the sheet is equivalent to the inspection result "fail".

In step S0708, if the inspection result is "fail" (YES in step S0708), the processing proceeds to step S0709. In step S0709, the CPU 0226 reads the operation mode from the RAM 0227. If the operation mode is the purge mode (YES in step S0709), the processing proceeds to step S0710. In step S0710, the CPU 0226 notifies the CPU 0216 that the inspection result is "fail", via the inspection unit I/F 0231 and the inspection apparatus I/F 0215.

Next, in step S0711, if the recovery setting read from the RAM 0227 by the CPU 0226 is "recover" (YES in step S0711), the processing proceeds to step S0712. In step S0712, the CPU 0226 waits to receive printing stop information from the CPU 0216 via the inspection unit I/F 0231 and the inspection apparatus I/F 0215. If the CPU 0226 receives the printing stop information (YES in step S0712), the processing proceeds to step S0713.

In step S0713, the CPU 0226 reads from the RAM 0227 the reference image corresponding to the sheet (the page) the inspection result of which is "fail" according to the determination in step S0706. Then, the CPU 0226 holds the reference image as an image to be inspected next. Next, in step S0714, the CPU 0226 notifies the CPU 0216 that the inspection is resumed, via the inspection unit I/F 0231 and the inspection apparatus I/F 0215.

In step S0715, the CPU 0226 adds information regarding the sheet the inspection result of which is "fail" to the inspection "fail" list 0504.

Next, the processing proceeds to step S0716, and steps S0703 to S0716 are repeated until the inspection of all the sheets is completed. If the inspection of all the sheets is completed, then in step S0717, the CPU 0226 receives an image reading end instruction from the user via the inspection button 0502 on the display unit 0245.

In step S0711, if the recovery setting read from the RAM 0227 by the CPU 0226 is "not recover" (NO in step S0711), the processing proceeds to step S0715. The processing can end similarly to the above flow. In step S0709, if the operation mode is the log mode (NO in step S0709), the processing proceeds to step S0715. Then, the processing can end similarly to the above flow.

Further, in step S0708, if the inspection result is "pass" (NO in step S0708), the processing proceeds to step S0716. After that, the processing can end similarly to the above flow.

The example illustrated here is merely an example. Alternatively, for example, the image reading start instruction from the user on the display unit 0245 may be automatically given in conjunction with a printing start instruction in the printing apparatus 0101, the information processing apparatus 0109, or the client computer 0110. The image reading end instruction from the user on the display unit 0245 may be automatically given in conjunction with the completion of printing in the printing apparatus 0101.

Figure 8:
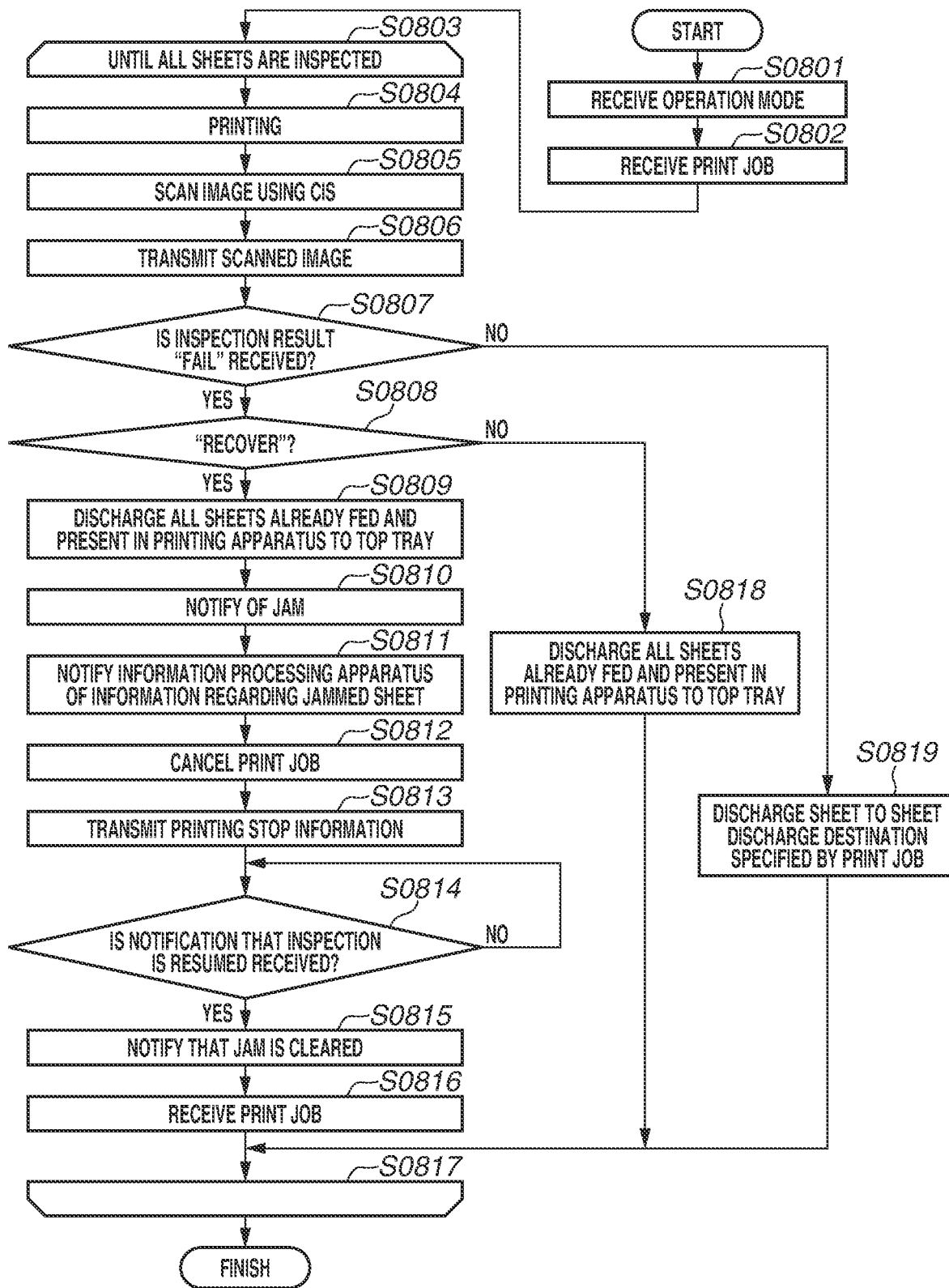
FIG. 8 is an operation flowchart of the inspection unit when an inspection is performed according to one or more aspects of the present disclosure.

FIG. 8 is an operation flowchart of the inspection unit 0106 when an inspection is performed.

In step S0801, the CPU 0216 receives an operation mode and a recovery setting set in step S0701 from the CPU 0226 via the inspection unit I/F 0231 and the inspection apparatus I/F 0215 and saves the operation mode and the recovery setting in the RAM 0217. Next, in step S0802, the CPU 0201 receives a print job and starts printing. Next, in step S0803, if there is a sheet as an inspection target, the processing proceeds to step S0804.

In step S0804, the printing apparatus 0101 prints an image on the sheet. Next, in step S0805, the CIS 0315 or 0316 scans the image printed on the conveyed sheet. Next, in step S0806, the inspection apparatus I/F 0215 transmits the image scanned in step S0805 to the inspection unit I/F 0231.

Next, in step S0807, if the inspection apparatus I/F 0215 receives the inspection result "fail" from the inspection unit I/F 0231 (YES in step S0807), the processing proceeds to step S0808. In step S0808, if the recovery setting read from the RAM 0217 by the CPU 0216 is "recover" (YES in step S0808), the processing proceeds to step S0809. In step S0809, the CPU 0216 instructs the accessory I/Fs 0208, 0214, and 0220 to discharge to the top tray 0320 all the sheets, including a sheet the inspection result of which is "fail" and subsequent sheets, already fed from the sheet feeding deck 0103 or 0104 and present on the sheet conveying paths.

Next, in step S0810, the CPU 0216 notifies the accessory I/Fs 0208, 0214, and 0220 of a jam state. Then, in step S0811, the CPU 0201 notifies the CPU 0234 of the jam state via the NW I/Fs 0207 and 0238. The jam state includes jam position information that can be obtained by a sensor (not illustrated) within the product inspection unit 0106 detecting a sheet. In step S0810, although the sheets are already discharged to outside the printing apparatus 0101, the mechanism of a jam is used in a simulated manner. The CPU 0201 can detect which sheet has jammed, and sheet information regarding this sheet is also included in the jam state.

In step S0812, the CPU 0201 cancels the print job. Next, in step S0813, the CPU 0216 transmits, to the CPU 0226 via the inspection apparatus I/F 0215 and the inspection unit I/F 0231, information indicating that all the sheets that should be discharged have been discharged in step S0809 and the printing apparatus 0101 has entered a printing stop state. Next, in step S0814, the CPU 0216 waits to acquire, via the inspection apparatus I/F 0215 and the inspection unit I/F 0231, information indicating that the inspection is resumed in step S0714.

In step S0815, the CPU 0216 notifies the accessory I/Fs 0208, 0214, and 0220 that the jam is cleared. Next, in step S0816, the CPU 0201 receives a print job anew for the sheet the inspection result of which is "fail" and subsequent sheets. Then, the processing proceeds to step S0817, and steps S0803 to S0817 are repeated until the inspection of all the sheets is completed. If the inspection of all the sheets is completed, this means that the printing is also completed. Thus, the flow ends.

In step S0808, if the recovery setting read from the RAM 0217 by the CPU 0216 is "not recover" (NO in step S0808), the processing proceeds to step S0818. In step S0818, the accessory I/F 0214 instructs the accessory I/F 0220 to discharge the sheet on which the image scanned in step S0805 is printed to the top tray 0320 of the large-capacity stacker 0107. Then, the processing proceeds to step S0817. After that, the processing ends similarly to the above flow.

In step S0807, if the inspection apparatus I/F 0215 does not receive the inspection result "fail" (NO in step S0807), the processing proceeds to step S0819. In step S0819, the CPU 0216 instructs the accessory I/Fs 0214 and 0220 to discharge this sheet to the sheet discharge destination specified by the print job. In the present exemplary embodiment, the sheet is discharged to a sheet discharge destination different from the top tray 0320, which is the sheet discharge destination of a sheet the inspection result of which is "fail". Then, the processing proceeds to step S0817. After that, the processing ends similarly to the above flow.

In the present exemplary embodiment, a sheet the inspection result of which is "fail" is discharged to the top tray 0320. Alternatively, for example, the sheet may be discharged to a tray different from the sheet discharge destination specified by the print job. That is, the sheet discharge destination of a sheet the inspection result of which is "fail" and the sheet discharge destination of a sheet the inspection result of which is "pass" may be different from each other. In the present exemplary embodiment, if the inspection result is "fail", the inspection apparatus 0108 notifies the inspection unit 0106 that the inspection result is "fail". Based on the notification that the inspection result is "fail", the inspection unit 0106 discharges the sheet to the top tray 0320. Alternatively, the inspection apparatus 0108 may notify the inspection unit 0106 of the inspection result "pass" instead of the inspection result "fail", or may notify the inspection unit 0106 of only the inspection result "pass". Then, if the inspection unit 0106 does not receive the inspection result "pass", the inspection unit 0106 may discharge the sheet to the top tray 0320.

In the present exemplary embodiment, a form is employed in which an operation mode and a recovery setting are specified in the inspection apparatus 0108, and the inspection unit 0106 included in the printing apparatus 0101 receives the operation mode and the recovery setting. Alternatively, a form may be employed in which, for example, the UI panel 0203 receives an operation mode and a recovery setting set by the user, and the inspection unit 0106 notifies the inspection apparatus 0108 of the operation mode and the recovery setting. In this case, screens displayed on the UI panel 0203 are similar to those in FIGS. 4A and 4B. In step S0701 in FIG. 7, an operation mode and a recovery setting are received instead of being selected. In step S0801 in FIG. 8, an operation mode and a recovery setting are selected instead of being received.

Figure 9:
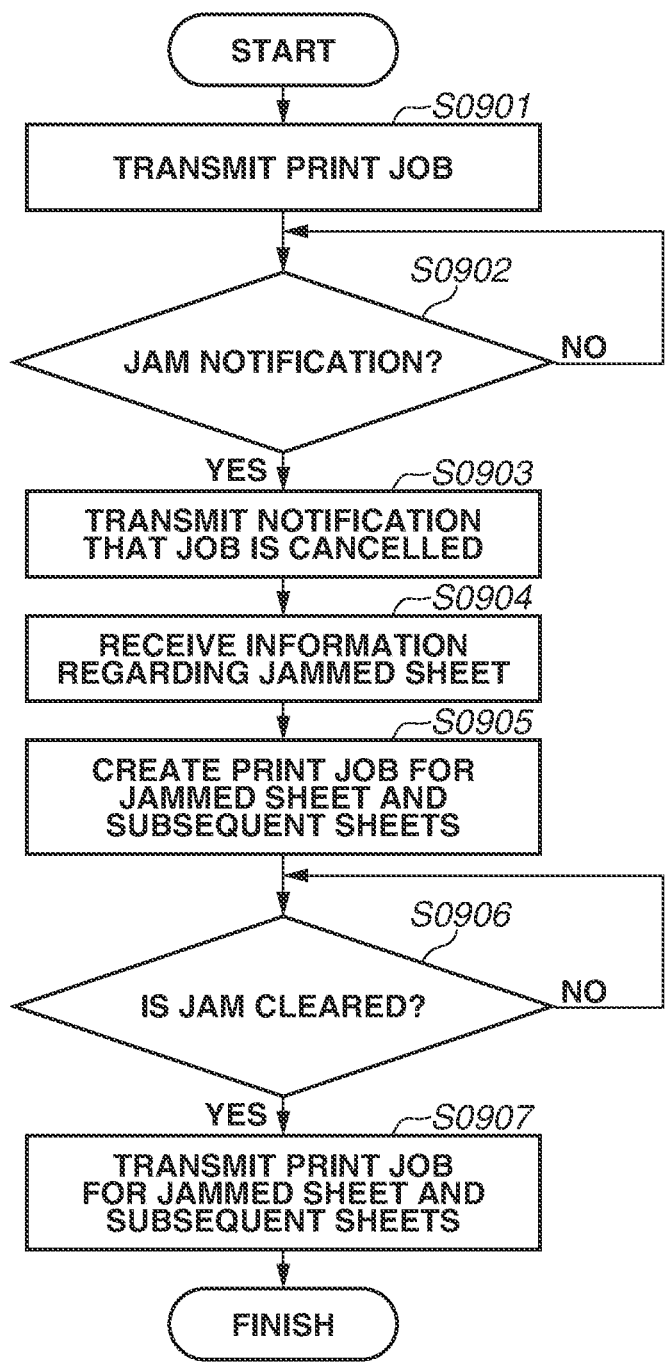
FIG. 9 is an operation flowchart of the information processing apparatus according to one or more aspects of the present disclosure.

FIG. 9 is an operation flowchart of the information processing apparatus 0109.

In step S0901, the CPU 0234 transmits a print job to the CPU 0201 via the NW I/Fs 0238 and 0207 and the video I/Fs 0223 and 0206. In step S0902, if a jam occurs in the printing apparatus 0101, the CPU 0234 acquires a jam notification issued in step S0810 or S0811 from the CPU 0201 via the NW I/Fs 0238 and 0207 (YES in step S0902), and the processing proceeds to step S0903. In step S0903, the CPU 0234 transmits, to the CPU 0201 via the NW I/Fs 0238 and 0207, a notification that the print job is cancelled.

Next, in step S0904, the CPU 0234 receives information regarding a jammed sheet via the NW I/Fs 0238 and 0207. Consequently, the CPU 0234 can know in which of the sheets the jam has occurred. Next, in step S0905, the CPU 0234 newly creates a print job (a reprint job) for the jammed sheet acquired in step S0904 and subsequent sheets. Then, in step S0906, the CPU 0234 waits to receive a notification that the jam is cleared in step S0815. If the CPU 0234 receives a notification that the jam is cleared (YES in step S0906), the processing proceeds to step S0907. In step S0907, the CPU 0234 transmits the print job for the jammed sheet and the subsequent sheets to the CPU 0201 via the NW I/Fs 0238 and 0207 and the video I/Fs 0223 and 0206. Then, the flow ends.

By the above procedure, according to the present exemplary embodiment, the user can set a desired operation mode and a desired recovery setting and easily acquire a sheet the inspection result of which is "pass" or "fail" at a sheet discharge destination distinguished as necessary. Consequently, the user can easily acquire a desired resulting product. Thus, it is possible to reduce the burden on the user.

In the first exemplary embodiment, the user sets an operation mode and a recovery setting in the operation mode selection portion 0402 and on the recovery setting screen 0403, respectively, and the inspection apparatus 0108 and the inspection unit 0106 achieve operations according to the operation mode and the recovery setting. In a second exemplary embodiment, a case is described where an operation mode and a recovery setting are automatically set based on the settings of a print job.

The second exemplary embodiment will be described below with reference to flowcharts. In the present exemplary embodiment, only the differences from the first exemplary embodiment will be described, and a redundant description will be omitted.

A program for the printing apparatus 0101 regarding these flows is stored in the storage unit 0205 of the printing apparatus 0101, loaded into the RAM 0202, and executed by the CPU 0201. A program for the inspection apparatus 0108 regarding these flows is stored in the storage unit 0228 of the inspection apparatus 0108, loaded into the RAM 0227, and executed by the CPU 0226. A program for the information processing apparatus 0109 regarding these flows is stored in the storage unit 0236 of the information processing apparatus 0109, loaded into the RAM 0235, and executed by the CPU 0234. A program for the client computer 0110 regarding these flows is stored in the storage unit 0244 of the client computer 0110, loaded into the RAM 0242, and executed by the CPU 0243.

Figure 10:
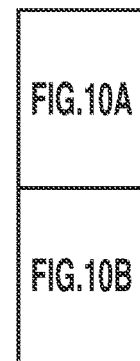
FIG. 10 includes
Figure 10A:
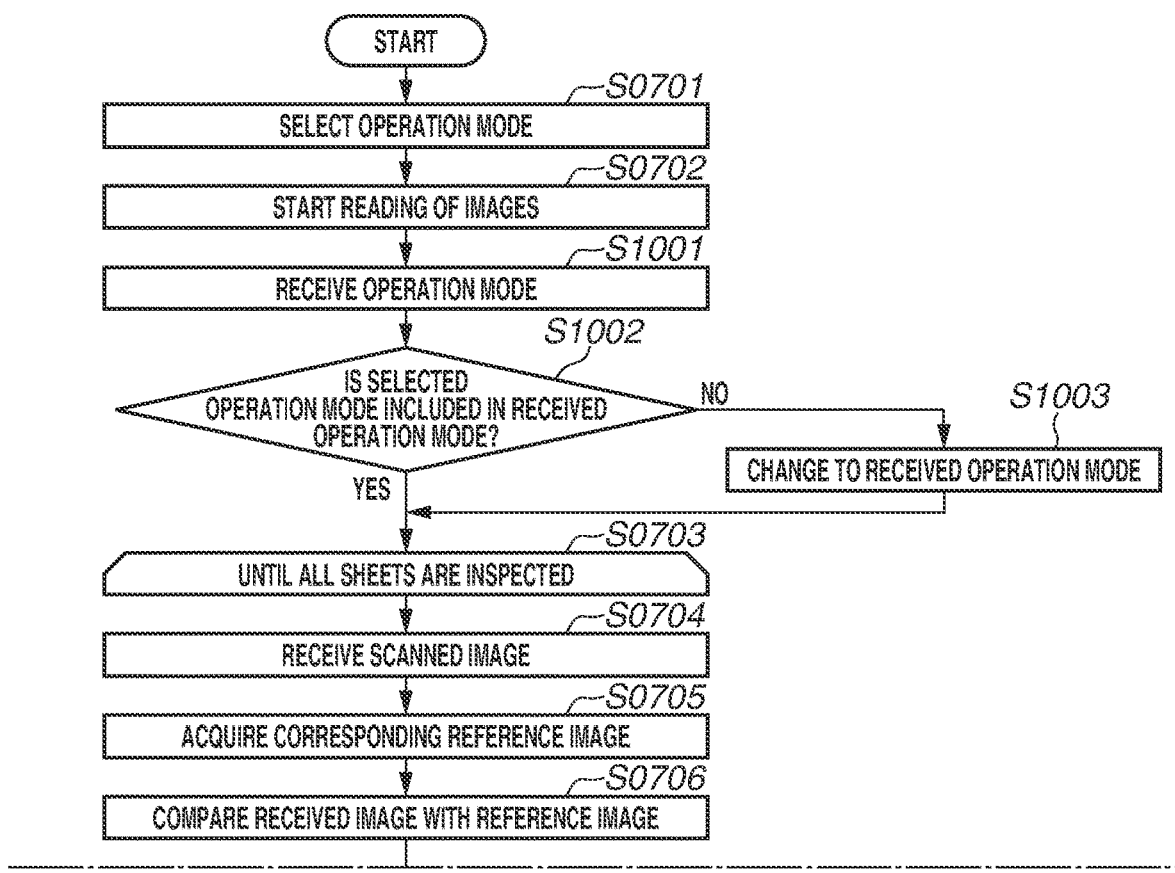
FIGS. 10A and 10B are an operation flowchart of an inspection apparatus when an inspection is performed according to one or more aspects of the present disclosure.
Figure 10B:
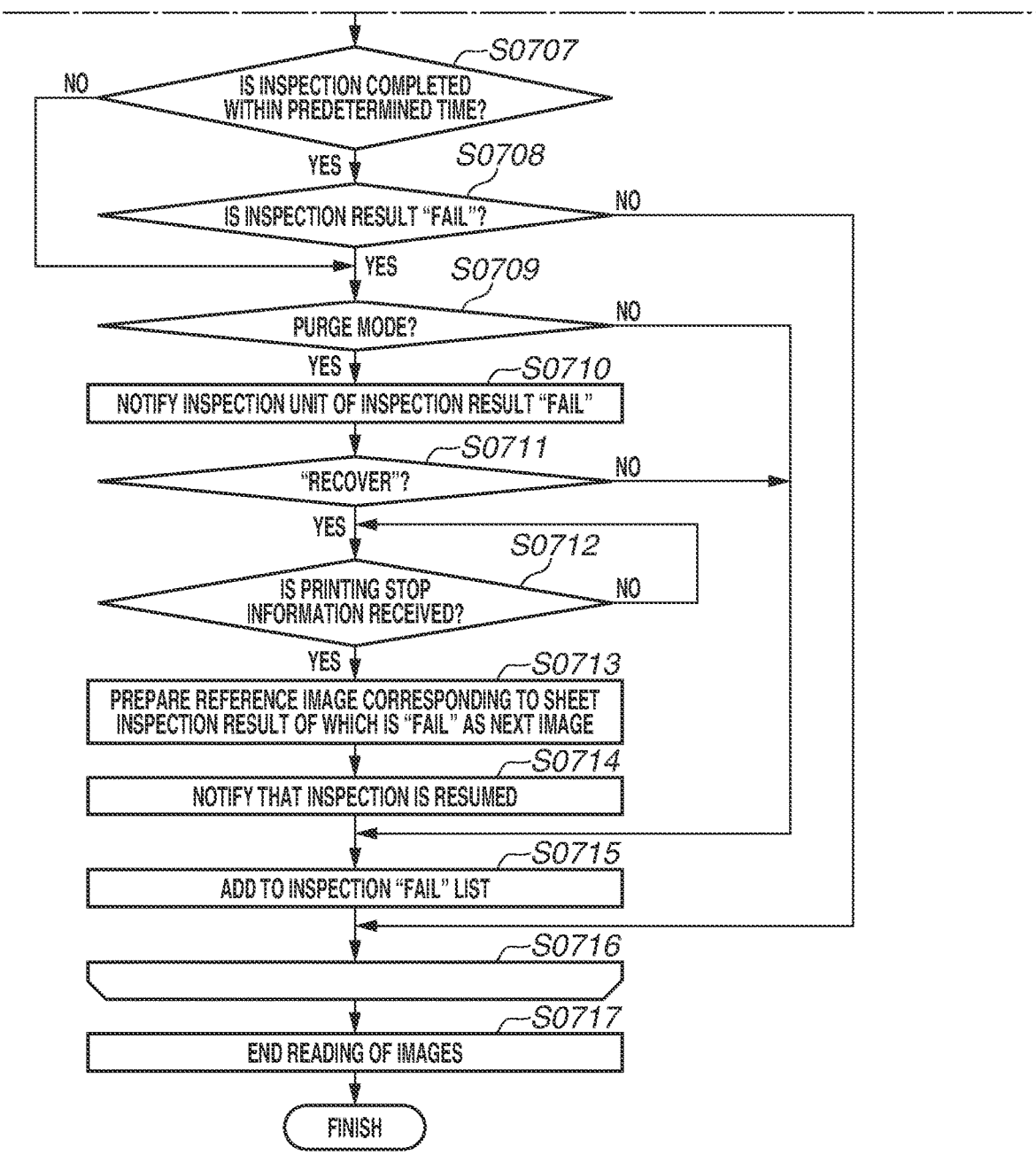

FIGS. 10A and 10B are a flowchart of the inspection apparatus 0108 when an inspection is performed.

Processes other than those of steps S1001 to S1003 are similar to those in the first exemplary embodiment.

In step S1001, the CPU 0226 receives an operation mode and a recovery setting from the CPU 0216 via the inspection unit I/F 0231 and the inspection apparatus I/F 0215. The operation mode and the recovery setting are determined by the CPU 0201 based on information regarding a print job by referencing an operation mode/recovery setting correspondence table 1201. The CPU 0201 determines an operation mode and a recovery setting that are compatible with print information regarding printing to be performed with reference to the operation mode/recovery setting correspondence table 1201 stored in the RAM 0202.

The CPU 0216 receives the operation mode and the recovery setting from the CPU 0201 via the accessory I/Fs 0208 and 0214.

Next, in step S1002, if the operation mode and the recovery setting set in step S0701, read from the RAM 0227 by the CPU 0226, and compatible with the print job are included in the operation mode and the recovery setting received by the CPU 0226 in step S1001 (YES in step S1002), the processing proceeds to step S0703. Then, the processing ends similarly to the first exemplary embodiment.

In step S1002, if the operation mode and the recovery setting set in step S0701 and read from the RAM 0227 by the CPU 0226 are not included in the operation mode and the recovery setting received by the CPU 0226 in step S1001 (NO in step S1002), the processing proceeds to step S1003. In step S1003, the CPU 0226 changes the operation mode and the recovery setting to the operation mode and the recovery setting received in step S1001 and overwrites the operation mode and the recovery setting in the RAM 0227. If the CPU 0226 receives a plurality of operation modes and a plurality of recovery settings, the CPU 0226 selects one of the operation modes and one of the recovery settings and overwrites the operation mode and the recovery setting in the RAM 0227. Then, the processing ends similarly to the first exemplary embodiment.

Figure 11:
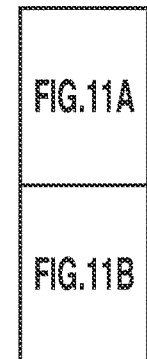
FIG. 11 includes
Figure 11A:
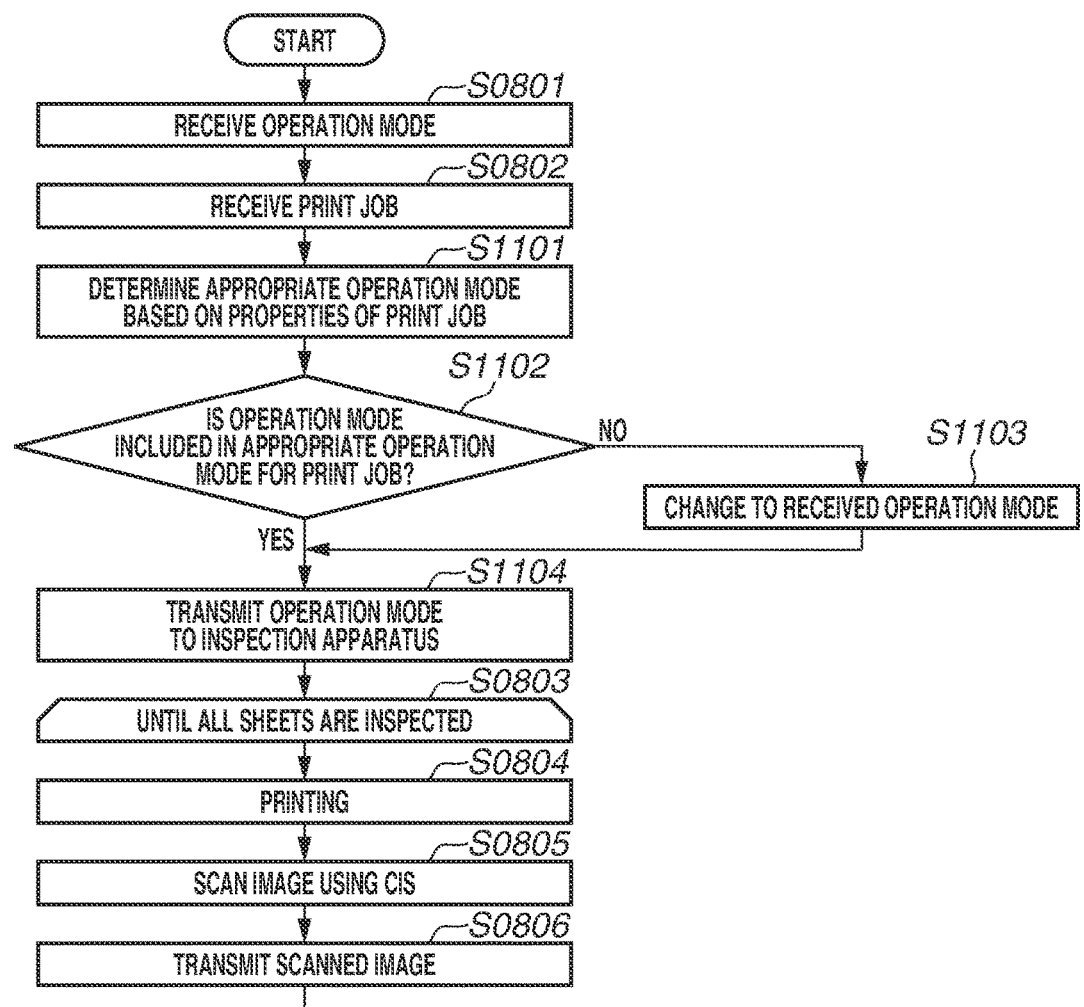
FIGS. 11A and 11B are an operation flowchart of an inspection unit when an inspection is performed according to one or more aspects of the present disclosure.
Figure 11B:
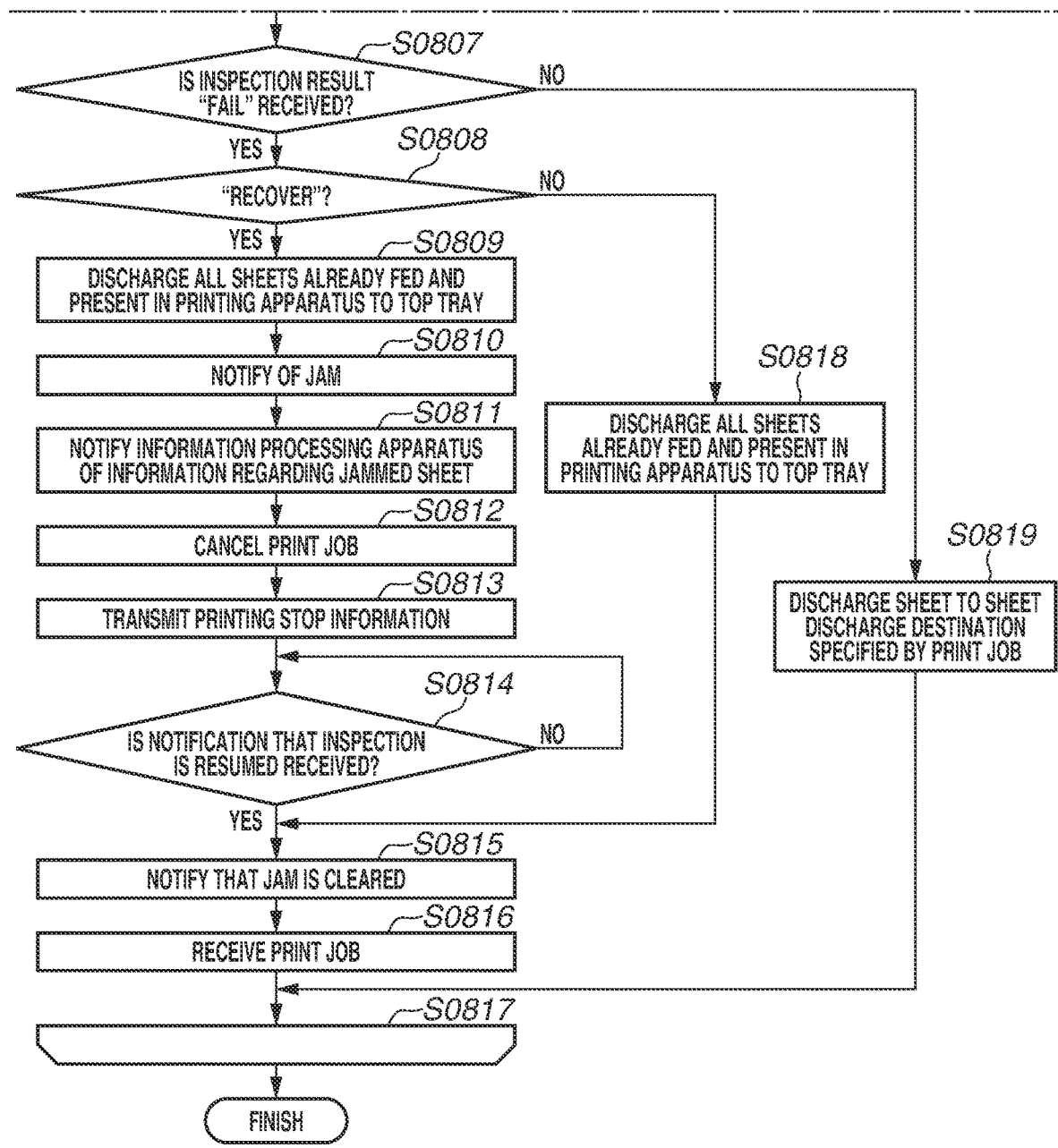

FIGS. 11A and 11B are an operation flowchart of the printing apparatus 0101 and the inspection unit 0106.

In step S1101, the CPU 0201 determines an operation mode and a recovery setting based on information regarding the print job. The CPU 0216 receives the operation mode and the recovery setting from the CPU 0201 via the accessory I/Fs 0208 and 0214.

In step S1102, if the operation mode and the recovery setting set in step S0801 and read from the RAM 0217 by the CPU 0216 are included in the operation mode and the recovery setting received by the CPU 0216 in step S1101 (YES in step S1102), the processing proceeds to step S1104. In step S1104, the CPU 0216 transmits the operation mode and the recovery setting to the CPU 0226 via the inspection apparatus I/F 0215 and the inspection unit I/F 0231. Then, the processing ends similarly to the first exemplary embodiment.

In step S1102, if the operation mode and the recovery setting set in step S0801 and read from the RAM 0217 by the CPU 0216 are not included in the operation mode and the recovery setting received by the CPU 0216 in step S1101 (NO in step S1102), the processing proceeds to step S1103. In step S1103, the CPU 0216 changes the operation mode and the recovery setting to the operation mode and the recovery setting received in step S1101 and overwrites the operation mode and the recovery setting in the RAM 0217. Then, the processing proceeds to step S1104. After that, the processing ends similarly to the above flow and the first exemplary embodiment.

FIG. 12 illustrates the operation mode/recovery setting correspondence table 1201. The operation mode/recovery setting correspondence table 1201 is stored in the RAM 0202. If the CPU 0201 receives a print job in step S0802, the CPU 0201 references the operation mode/recovery setting correspondence table 1201 and determines whether information regarding the print job is included in the operation mode/recovery setting correspondence table 1201. If the information regarding the print job received in step S0802 is included in the operation mode/recovery setting correspondence table 1201, the CPU 0201 can determine which operation mode and recovery setting are compatible with the print job.

In a case where a sheet long in the conveying direction is used (No. 1 in FIG. 12), it is possible that the sheet cannot be discharged to the main tray 0324 of the large-capacity stacker 0107, or an instruction to change the sheet discharge destination to the top tray 0320 based on the inspection result cannot be given in time. Thus, in the case of a print job using a long sheet, the "purge mode" is not set, but the "log mode" is set.

In the case of a print job for saddle stitching (No. 8 in FIG. 12), if finishing is performed in the "log mode", and a sheet the inspection result of which is "fail" is mixed later, a resulting product corresponding to one bundle goes to waste. Thus, the "purge mode" and "recover" are set. Not only for saddle stitching, but also for a finishing setting for collectively binding a plurality of sheets, similarly, the "purge mode" and "recover" are set.

In a case where an offline finisher is used (No. 5 in FIG. 12), the "purge mode" and "recover" are set. This is because, if a sheet the inspection result of which is "fail" is mixed, or if printing is not performed by recovering a sheet the inspection result of which is "fail", a correct resulting product cannot be obtained. On the other hand, even in a case where an offline finisher is used, but if the offline finisher has a mechanism for, using the log of the inspection result "pass" or "fail" and on a booklet-by-booklet basis, determining whether to use the booklet (No. 6 in FIG. 12), the "log mode" is set.

In the case of a job in which a single copy is composed of a plurality of sheets (No. 4 in FIG. 12), "not recover" in the "purge mode" is not set. In a resulting product in which one copy includes a plurality of sheets, if only a "fail" sheet is missing from the final resulting product, a correct resulting product cannot be obtained. For example, in the case of a print job in which one copy includes four pages, if the inspection result is "fail" on the second page, the situation is avoided where a sheet on the first page, a sheet on the third page, and a sheet on the fourth page are discharged to the main tray 0324, and a sheet on the second page is discharged to the top tray 0320. That is, in the case of a resulting product including a plurality of sheets, the setting of "not recover" in the "purge mode" is prohibited from being used so that a missing page does not occur. The determination of whether a job uses a plurality of sheets may be made based on, for example, the number of pages and information regarding the layout that are included in the print job. For example, if the print job includes eight pages, and a 2-in-1 layout is set, it is determined that the print job uses a plurality of sheets. Alternatively, the determination may be made based on the number of pages, information regarding the layout, and a two-sided/one-sided setting that are included in the print job. For example, if the print job includes four pages, and a 2-in-1 layout is set, and two-sided printing is set, printing is to be performed on a single sheet. Thus, it is determined that the print job does not use a plurality of sheets.

In a case where the "purge mode" and "recover" are set, and if the inspection result "fail" occurs, several subsequent sheets are also discharged to the top tray 0320. Thus, for example, in a case where printing is performed on a gift certificate, or in a case where printing is performed on high-grade paper (No. 2 or No. 7 in FIG. 12), the discharged subsequent sheets may be abused. Thus, in a case where job information indicating abuse prohibition or a secret mode is assigned to a print job, or in a case where the sheet type is set to high-grade paper, the "log mode" is set, or the "purge mode" and "not recover" are set.

In a case where the number of copies is small (the number of copies is five or less in the example of FIG. 12) (No. 3 in FIG. 12), the "log mode" is set so that the sheet discharge destination is not changed regardless of the inspection result. Accordingly, after a resulting product is output, it is easy for the user to confirm the resulting product.

The correspondence table 1201 in FIG. 12 is merely an example, and not all the conditions (No. 1 to 8 in FIG. 12) need to be used. Further, a different condition may be added after No. 9 in FIG. 12.

In the present exemplary embodiment, similar to the first exemplary embodiment, a form is employed in which an operation mode and a recovery setting are specified in the inspection apparatus 0108, and the inspection unit 0106 provided in the printing apparatus 0101 receives the operation mode and the recovery setting. Alternatively, similar to the first exemplary embodiment, a form may be employed in which, for example, the UI panel 0203 receives an operation mode and a recovery setting set by the user, and the inspection unit 0106 notifies the inspection apparatus 0108 of the operation mode and the recovery setting.

Further, an example has been described where the printing apparatus 0101 determines the operation mode with reference to the correspondence table 1201 in FIG. 12. Alternatively, the inspection apparatus 0108, the information processing apparatus 0109, and the client computer 0110 may determine the operation mode and notify the printing apparatus 0101 of the determination result.

As described above, according to the present exemplary embodiment, it is possible to set an optimal operation mode and an optimal recovery setting based on the settings of a print job and discharge an inspected sheet. Consequently, the user can discharge a desired resulting product in an optimal sheet discharge form to an appropriate sheet discharge destination. This reduces the burden on the user.

According to the above exemplary embodiments, the effect of controlling whether to switch a sheet discharge destination according to the inspection result of the quality of a print product is obtained.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-069492, filed Apr. 8, 2020, which is hereby incorporated by reference herein in its entirety.

What is claimed is:

1. An inspection system that inspects a quality of a print product, the inspection system comprising:
   an inspection unit configured to inspect a quality of the print product based on comparison between a scanned image obtained by scanning a print product and a reference image;
   a display control unit configured to display a screen for receiving a first mode that does not switch a sheet discharge destination of the print product regardless of an inspection result of the print product and a second mode that switches the sheet discharge destination of the print product according to the inspection result of the print product;
   a reception unit configured to receive via the screen the first mode that does not switch the sheet discharge destination of the print product regardless of the inspection result of the print product or the second mode that switches the sheet discharge destination of the print product according to the inspection result of the print product; and
   a control unit configured to, based on the inspection result obtained by the inspection unit inspecting the quality of the print product and a mode received by the reception unit, control the sheet discharge destination of the print product.

2. The inspection system according to claim 1, wherein the display control displays a screen for receiving an instruction to perform reprinting from an image corresponding to a sheet for which the inspection result of the print product is "fail", and wherein the reception unit further receives via the screen the instruction to perform reprinting from the image corresponding to the sheet for which the inspection result of the print product is "fail".

3. The inspection system according to claim 2, wherein, in a case where the reception unit receives the second mode, the reception unit receives the instruction to perform reprinting from the image corresponding to the sheet for which the inspection result of the print product is "fail".

4. The inspection system according to claim 3, wherein, in a case where the reception unit does not receive the instruction to perform reprinting from the image corresponding to the sheet for which the inspection result of the print product is "fail", the control unit performs control to output the sheet for which the inspection result of the print product is "fail" and a sheet for which the inspection result of the print product is "pass" to different sheet discharge destinations.

5. An information processing apparatus that inspects a quality of a print product, the information processing apparatus comprising:
   an inspection unit configured to inspect a quality of the print product based on comparison between a scanned image obtained by scanning a print product and a reference image;
   a display control unit configured to display a screen for receiving a first mode that does not switch a sheet discharge destination of the print product regardless of an inspection result of the print product and a second mode that switches the sheet discharge destination of the print product according to the inspection result of the print product;
   a reception unit configured to receive via the screen the first mode that does not switch the sheet discharge destination of the print product regardless of the inspection result of the print product or the second mode that switches the sheet discharge destination of the print product according to the inspection result of the print product; and
   a control unit configured to, based on the inspection result obtained by the inspection unit inspecting the quality of the print product and the mode received by the reception unit, control whether to transmit the inspection result to an apparatus to which the print product is to be discharged.

6. The information processing apparatus according to claim 5, wherein the display control unit displays a screen for receiving an instruction to perform reprinting from an image corresponding to a sheet for which the inspection result of the print product is "fail", and wherein the reception unit farther receives through the screen the instruction to perform reprinting from the image corresponding to the sheet for which the inspection result of the print product is "fail".

7. The information processing apparatus according to claim 6, wherein, in a case where the reception unit receives the second mode, the reception unit receives the instruction to perform reprinting from the image corresponding to the sheet for which the inspection result of the print product is "fail".

8. The information processing apparatus according to claim 7, wherein, in a case where the reception unit receives the second mode and does not receive the instruction to perform reprinting from the image corresponding to the sheet for which the inspection result of the print product is "fail", a transmission unit transmits, to the apparatus to which the print product is to be discharged, information indicating that the inspection result of the print product is "fail".

9. The information processing apparatus according to claim 5, wherein, in a case where the reception unit receives the first mode, a transmission unit does not transmit the inspection result of the print product to the apparatus to which the print product is to be discharged.

10. A control method for controlling an information processing apparatus that inspects a quality of a print product, the control method comprising:
    inspecting a quality of the print product based on comparison between a scanned image obtained by scanning a print product and a reference image;
    displaying a screen for receiving a first mode that does not switch a sheet discharge destination of the print product regardless of an inspection result of the print product, and a second mode that switches the sheet discharge destination of the print product according to the inspection result of the print product;
    receiving via the screen the first mode that does not switch the sheet discharge destination of the print product regardless of the inspection result of the print product or the second mode that switches the sheet discharge destination of the print product according to the inspection result of the print product; and
    controlling whether to transmit the inspection result to an apparatus to which the print product is to be discharged based on the inspection result obtained by inspecting the quality of the print product and the received mode.

* * * * *